US011240232B2

(12) United States Patent
Meruva et al.

(10) Patent No.: US 11,240,232 B2
(45) Date of Patent: Feb. 1, 2022

(54) MULTI-LEVEL AUTHENTICATION FOR A FIRE CONTROL SYSTEM

(71) Applicant: Honeywell International Inc., Morris Plains, NJ (US)

(72) Inventors: Jayaprakash Meruva, Bangalore (IN); Rajesh Babu Nalukurthy, Bangalore (IN); Rich Lau, New York City, NY (US)

(73) Assignee: Honeywell International Inc., Charlotte, NC (US)

( * ) Notice: Subject to any disclaimer, the term of this patent is extended or adjusted under 35 U.S.C. 154(b) by 373 days.

(21) Appl. No.: 16/359,674

(22) Filed: Mar. 20, 2019

(65) Prior Publication Data
US 2020/0304494 A1   Sep. 24, 2020

(51) Int. Cl.
*H04L 29/06* (2006.01)
*G06F 16/16* (2019.01)
(Continued)

(52) U.S. Cl.
CPC ........ *H04L 63/0853* (2013.01); *G06F 16/168* (2019.01); *G06F 16/176* (2019.01);
(Continued)

(58) Field of Classification Search
CPC ............... H04L 63/0853; H04L 63/101; H04L 2463/082; G06F 16/176; G06F 16/168; G08B 17/00
See application file for complete search history.

(56) References Cited

U.S. PATENT DOCUMENTS 7,966,493 B2   6/2011   Puri et al.
8,437,499 B2   5/2013   Case
(Continued)

OTHER PUBLICATIONS

Microsoft Corp., "Microsoft Releases Microsoft Dynamics GP Extensions", https://news.microsoft.com/2006/03/27/microsoft-releases-microsoft-dynamics-gp-extensions/, Mar. 27, 2006, 10 pages.

*Primary Examiner* — Shin-Hon (Eric) Chen
(74) *Attorney, Agent, or Firm* — Brooks, Cameron & Huebsch, PLLC

(57) ABSTRACT

Systems, devices, and methods for multi-level authentication for a fire control system are described herein. One system includes a first device configured to receive a request corresponding to an action to be performed regarding an electronic record generated for a fire control system and receive a first authentication form a first user for the action regarding the electronic record generated for the fire control system. The system is further comprised of one or more secondary devices configured to receive a notification of the request and a secondary authentication from at least one of a number of required users for the action regarding the electronic record to be performed. The system also includes a computing device configured to receive the first authentication from the first device and each of the secondary authentications from each of the one or more secondary devices and perform the action regarding the electronic record based on the first authentication received from the first device each of the secondary authentications received from each of the one or more secondary devices.

19 Claims, 5 Drawing Sheets

(51) Int. Cl.
*G08B 17/00* (2006.01)
*G06F 16/176* (2019.01)

(52) U.S. Cl.
CPC ............ *G08B 17/00* (2013.01); *H04L 63/101* (2013.01); *H04L 2463/082* (2013.01)

(56) References Cited

U.S. PATENT DOCUMENTS

| | | | |
|---|---|---|---|
| 8,966,578 B1* | 2/2015 | Belov | G06F 9/45558 726/1 |
| 2008/0289005 A1 | 11/2008 | Skowron et al. | |
| 2013/0082819 A1* | 4/2013 | Cotterill | H04L 63/083 340/5.51 |
| 2013/0173470 A1* | 7/2013 | Nuzzi | G06Q 20/3224 705/44 |
| 2013/0291056 A1* | 10/2013 | Gaudet | G06F 21/35 726/1 |
| 2014/0282895 A1* | 9/2014 | Stuntebeck | G06F 21/34 726/4 |
| 2015/0378842 A1* | 12/2015 | Tomlinson | H04L 9/085 380/28 |
| 2019/0052708 A1* | 2/2019 | Xiang | H04L 69/40 |
| 2019/0312880 A1* | 10/2019 | Shah | H04L 63/0853 |

\* cited by examiner

MULTI-LEVEL AUTHENTICATION FOR A FIRE CONTROL SYSTEM

TECHNICAL FIELD

The present disclosure relates generally to systems, methods, and devices for multi-level authentication for a fire control system.

BACKGROUND

Certain industry-specific regulations often require electronic records to contain electronic signatures. In addition, accessing certain important documents (e.g., inspection reports) and logs or changing parameters of a system may require multi-level authentication. For example, performance of these actions may require first-level authentication by an operator (e.g., a technician) who is accessing the documents and a second-level authentication by a manger or someone who is ranked above the operator in authority.

However, current fire control systems do not have the provisions to support these needs. Instead, each electronic security device (ESD) of a current fire control system may follow their own mechanism to comply with the regulations and may sometimes rely on supervisory systems for support.

Furthermore, some current fire control systems may only support dual authentication where the first authentication is performed by an operator entering a login and password at a work station and the second authentication is performed by a manager who goes to the same workstation and enters their credentials after the operator is finished. This option is also unworkable whenever the operator and manager are not simultaneously available to perform these tasks. Thus, in urgent situations, a third person is often required to collect credentials from a manager over the phone and enter them on their behalf, which does not comply with good security practices. Additionally, this option can be time-consuming when authentications from more than two users are required.

DETAILED DESCRIPTION

Figure 1:
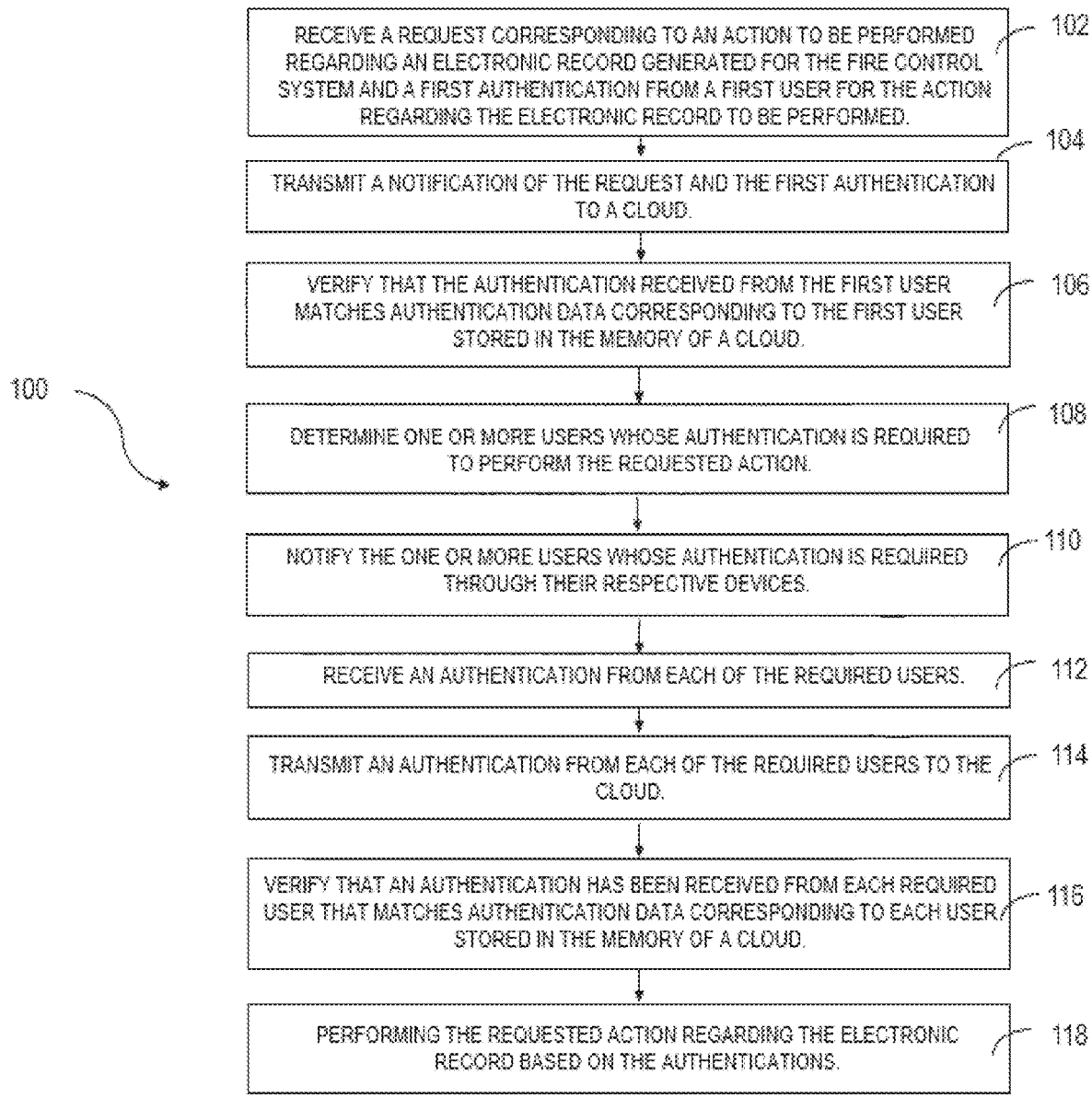
FIG. 1 illustrates an example of a method of multi-level authentication for a fire control system in accordance with an embodiment of the present disclosure.

Systems, methods, and devices for multi-level authentication for a fire control system are described herein. For example, an embodiment includes a multi-level authentication system for a fire control system comprising a first device configured to receive a request corresponding to an action to be performed regarding an electronic record generated for a fire control system and receive an authentication from a first user regarding the action regarding the electronic record to be performed. The system can be further comprised of one or more secondary devices, each configured to receive a notification of the request and receive a secondary authentication from at leat one of a number of required users for the action regarding the electronic record to be performed. The system can also include a computing device configured to receive the first authentication from the first device and each of the secondary authentications from each of the one or more secondary devices and perform the action regarding the electronic record based on the first authentication received from the first device and each of the secondary authentications received from each of the one or more secondary devices.

In contrast to previous methods of multi-level authentication in fire control system, which require all users to perform their authentication through a single device, the present disclosure allows for each user to perform their authorization through separate devices, such as, for example, through a web application. Accordingly, methods of multi-level authentication in accordance with the present disclosure may allow multi-level authentication to be accomplished much more efficiently and in a more secure manner.

This disclosure also allows authentication to be performed efficiently and securely, regardless of the locations of users. Embodiments of the present disclosure can allow users (e.g. operator, electronic security device admin, facility manager, technician) who have a profile created in a system portal to be assigned a user certificate to be used for tasks requiring electronic signatures or multi-level authentication. In some embodiments, these certificates can be generated internally. The certificates may also be purchased by users and uploaded into the system. Certificates can be maintained securely in a system cloud or memory working as part of a cloud.

Embodiments of the present disclosure can allow an operator to provide an authentication (e.g., signature) from a mobile device using an application, such as a mobile application or a web application. Documents can then be generated in a system cloud, and the documents can be signed electronically using the user's corresponding digital certificate available in the cloud. If a situation requires multi-level authentication to be completed before committing a document into the cloud, a first user will be able to generate the necessary documents and notify one or more users whose authentication is required (e.g. their manager) of a need for a secondary authentication through the application. Each of the one or more required users can then review and approve the documents, providing an electronic signature through their authentication key, which can be maintained in the system.

Furthermore, embodiments of the present disclosure can allow users to obtain authentications from other users who are not physically available and copy documents onto a local machine. A user whose authentication is required can receive a notification of a request for approval through an application. Once this user has approved through the application, the first user can then copy the documents onto a local machine.

Accordingly, embodiments of the present disclosure can facilitate multi-level authentication by removing the requirement for two authenticators to be simultaneously available and/or in the same location.

As used herein, the term "authentication" can be used to refer to an authorization, approval, key or signature in addition to its commonly understood meaning. In accordance with the present disclosure, an authentication can be received from a user in a multitude of ways. These can include, but are not limited to, performing a signature on the screen of a mobile device using a finger or a suitable device; scanning, reading, or inserting a physical key; entering a password or code using some form of a screen or keypad; facial recognition; and biometric inputs, such as scanning a portion of a finger.

As described herein, users can enter input through a multitude of ways. These can include, but are not limited to, typing on a physical keyboard, pushing buttons on a device, typing on screen, drawing or writing on a screen using a finger or other appropriate device, speaking into device, and using a mouse to select an input.

In some embodiments, an authentication can be verified by a mobile device or mobile application. The mobile device or mobile application can then communicate to the cloud that the authentication is verified. For example, many mobile devices provide features that allow users to set up an authentication for the device and use that authentication in various applications stored on the device.

As used herein, the term "certificate" is synonymous with the term "electronic certificate" and can refer to a set of data that enables the identification of a user. This set of data can include, but is not limited to: a user's fingerprint, a passcode, or data identifying a user's physical key. The data contained in a user's certificate can be referred to as "authentication data". When an authentication is received from a user and matches one or more of the authentication data points of the electronic certificate for that user, a document can be electronically signed to show that it was authenticated by the user. In some embodiments, each certificate may also contain information about which actions require the corresponding user's authentication in order to be performed. This can facilitate the process of determining which users to notify when a request for an action is submitted by a first user. A certificate for a user can be generated internally a system and then maintained securely in a cloud. Users can also purchase certificates for themselves and upload them into the system.

As used herein, the term "application" can refer to an application accessed through a mobile device. An "application" as described herein can also be accessed via a network or via the web.

As used herein, the term "mobile device" can refer to any device accessed by a user which is sufficiently portable. This can include, but is not limited to, cell phones (e.g., smart phones), tablets, and portable computers.

As used herein, a "network" can provide a communication system that directly or indirectly links two or more computer and/or mobile devices and allows users to access resources or other computing devices and exchange messages with other users. A network can allow users to share resources on their own systems with other network users and to access information on centrally located systems or on systems that are located at remote locations. For example, a network can tie a number of devices together to form a distributed control network (e.g., a cloud).

A network may provide connections to the Internet and/or to the networks of other entities (e.g., organizations, institutions, etc.). Users may interact with network-enabled software applications to make a network request. Applications may also communicate with network management software, which can interact with network hardware to transmit information between devices on the network.

As used herein, the term "cloud", or distributed control network, can be used to refer to a server and/or computing device working in conjunction with other computing resources (hardware, software, logic, memory, processor, etc.) that can be used as a service over a communications network (in a wired and/or wireless manner over the internet). The server, computing device, and other computing resources can all be referred to as being part of the "cloud".

As referred to herein, a "memory" can be any type of storage medium that can be accessed by a processor to perform various examples of the present disclosure. For example, a memory can be a non-transitory computer readable medium having computer readable instructions (e.g., computer program instructions) stored thereon that are executable by a processor to perform various examples of the present disclosure. That is, a processor can execute the executable instructions stored in a memory to perform various examples in accordance with the present disclosure.

Memory can be volatile or nonvolatile. Memory can also be removable (e.g., portable) memory, or non-removable (e.g., internal) memory. For example, memory can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a", "an", or "a number of" something can refer to one or more such things, while "a plurality of" something can refer to more than one such things. For example, "a number of devices" can refer to one or more devices, while "a plurality of devices" can refer to more than one device.

FIG. 1 illustrates a method 100 of multi-level authentication for a fire control system in accordance with one or more embodiments of the present disclosure. The fire control system can be the fire control system of a facility (e.g., building), such as, for instance, a large facility having a large number of floors, such as a commercial facility, hospital, office building, and the like. However, embodiments of the present disclosure are not limited to a particular type of facility. The fire control system may include a number of components located throughout the facility (e.g., on different floors of the facility). For example, a fire control system may include sensors (e.g., smoke detectors) that can sense a fire occurring in the facility, alarms that can provide a notification of the fire to the occupants of the facility, fans and/or dampers that can perform smoke control operations (e.g., pressurizing, purging, exhausting, etc.) during the fire, and/or sprinklers that can provide water to extinguish the fire, among other components. A fire control system may also include a physical fire control panel (e.g., box) installed in the facility that can be used by a user to directly control the operation of the components of the fire control system.

At block 102, method 100 includes receiving a request corresponding to an action to be performed regarding an electronic record generated for the fire control system, and receiving an authentication from a first user for the action regarding the electronic record to be performed. The request and the authentication can be received by a first device, which can be, for instance, a mobile device, from a user of the device through various ways, such as a mobile application, or a web application. The authentication can also be performed in a multitude of ways, such as entering a passcode, providing a physical key, or performing a scan of a portion of one's iris or finger. In some embodiments, the authentication can be verified by the device and/or application that received the authentication. The device and/or application that receives the request and authentication can transmit a notification of the request and the authentication, along with relevant documents and other details concerning the request, to a cloud (e.g., a cloud computing device and/or server) at block 104 of method 100.

At block 106, method 100 includes verifying that the authentication received from the first user matches authentication data corresponding to the first user stored in the memory of a cloud. For example, the memory of the cloud can include several digital certificates, wherein each certificate corresponds to a different user. The certificate can store authentication data for each user and for each way through which each user can provide authentication. For example, if the system is configured to allow a first user to provide authentication through a passcode or a thumb scan, the digital certificate corresponding to that user may contain data identifying the passcode or thumb scan that must be submitted in order to constitute a valid authentication from that user. If the authentication submitted does not match any of the authentication data points stored in the digital certificate for that user, the cloud can notify the user through whichever device they used to submit the request. If the authentication does match an authentication data point of the digital certificate, the cloud can proceed to determine one or more users whose authentication is required to perform the requested action at block 108 of method 100.

In some embodiments, the cloud may include a database of actions that can be performed, and criteria for properly authenticating each respective action. For instance, the cloud can include a list of users associated with the fire control system from whom authentication must be received in order to perform a certain action, and authentication data corresponding to each respective user. In some embodiments, the cloud can include a hierarchy of users. In these embodiments, the criteria for properly authenticating an action requested by a first user (e.g. an operator) can include receiving authentication from a second user with a higher hierarchical ranking than the first user (e.g. a manager). The criteria for properly authenticating an action requested by a first user can further include receiving an authentication from a user with a higher hierarchical ranking than the second user (e.g. an executive).

Once the users whose authentication is required to perform the requested action are identified, those users can be notified at block 110 of method 100. The users can be notified through their respective devices (e.g., mobile devices), such as, for instance, through a mobile application or web application of their respective devices, receiving the notification of the request from the cloud. The notification can include details about the request, including, for example, documents pertaining to the request, comments from the original requestor (e.g. first user) and/or an identification of the party who submitted the original request (e.g. first user), among other details.

The device (e.g., web application or mobile application) used to notify a required user can also be used to receive an authentication from that user for the action regarding the electronic record to be performed. As such, the method 100 can further comprise receiving the authentication from each required user at block 112. As previously discussed, this authentication can be received in a multitude of ways that can be customizable to each user.

In some embodiments, after receiving an authentication from a user, the application or device on which the application is housed can verify the authentication. Additionally, the authentication from each required user is transmitted to the cloud at block 114 of method 100. At block 116, method 100 includes verifying that the authentication received from these users match authentication data corresponding to these users stored in the memory of a cloud. Any relevant comments or documents inputted by the required users can also be transmitted to the cloud along with the authentication.

The verification of block 116 can comprise, for instance, verifying that each authentication received matches at least one authentication datapoint of a certificate corresponding to that user and stored in the cloud. For example, if a user's certificate contains a passcode of "1234" along with data for a thumb scan of that user and the user only submits the passcode "1234", the authentication can be verified.

At block 118, method 100 includes performing the requested action regarding the electronic record based on the authentications (e.g., upon verifying the authentications match their corresponding authentication data). In some embodiments, the requested action may be performed by a building system of a facility from which the first user requested the action. In other embodiments, the requested action may be carried out through a mobile application or web application.

In some embodiments, performing the requested action can include retrieving data from the cloud to be copied onto documents. In some embodiments, performing the requested action can include transmitting the electronic record to another device, storing the electronic record in the cloud, modifying the electronic record, and/or retrieving the electronic record. As an example, a document can be generated from the electronic record, and if the document requires electronic signatures, signatures that are stored in the cloud as part of each user's digital certificate can be printed onto the relevant document after the authentications from each user are received and verified. Further, the document may be copied onto a device selected by the first user.

In some embodiments, performing the requested action can include changing a parameter of the fire control system. As an example, a first user can request to open the dampers of a certain floor of a facility. Upon receiving an authentication from each of the users whose authentication is required to perform this action, the dampers of the specified floor can be opened.

Figure 2:
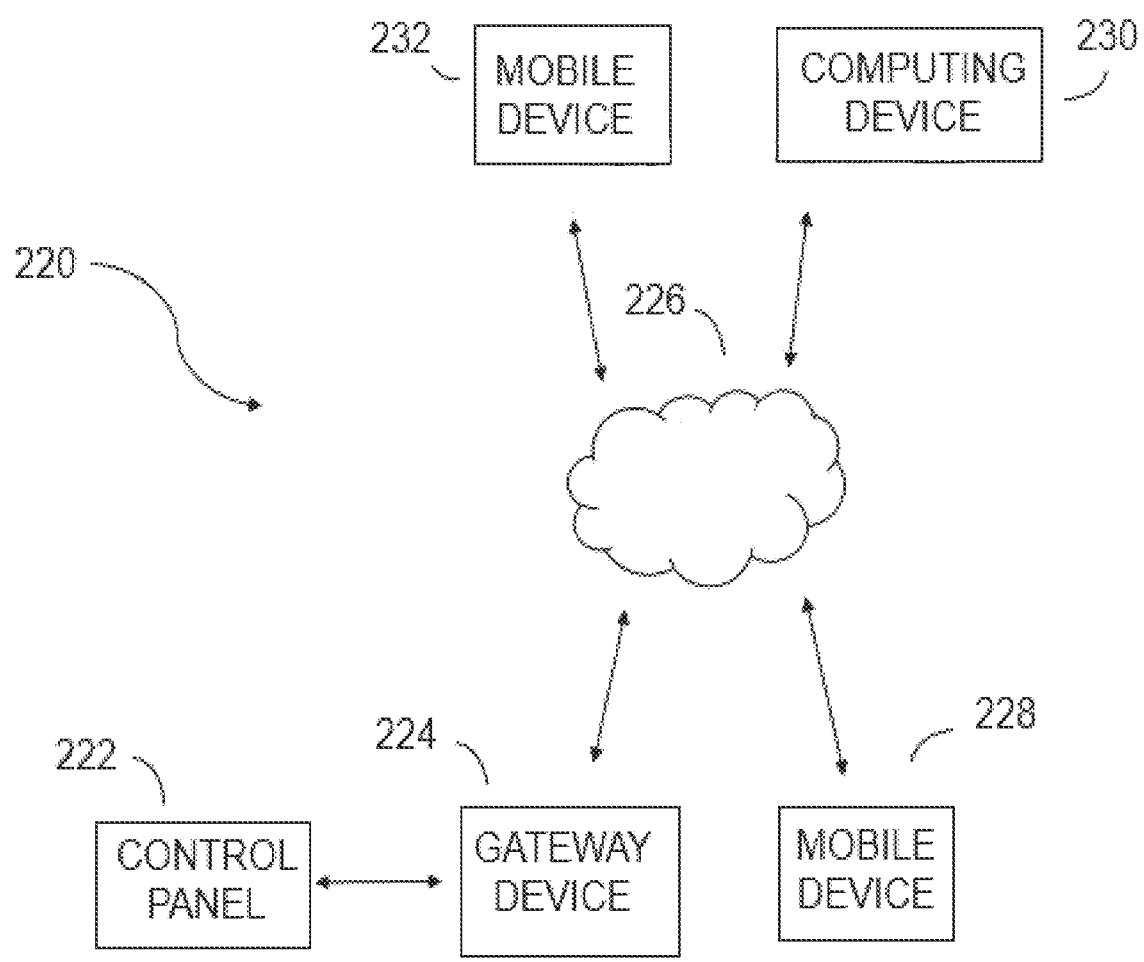
FIG. 2 illustrates an example of a system of multi-level authentication for a fire control system in accordance with an embodiment of the present disclosure.

FIG. 2 illustrates a system 220 of multi-level authentication for a fire control system in accordance with one or more embodiments of the present disclosure. As shown in FIG. 2, system 220 can include control panel 222, gateway device 224, computing device 230, and mobile devices 228 and 232. Control panel 222 can be a physical fire control panel (e.g., box) installed in a facility that can be used by a user to directly control the operation of the components of the fire control system, as previously described herein. Gateway device 224 may be used by a user (e.g., maintenance technician or operator) to perform inspections, maintenance, and/or upgrades, among other operations, on a fire control system (e.g., on the components of the fire control system) of a facility. For instance, the user may connect the gateway device to the fire control panel 224 of the fire control system, and the gateway device can communicate with the fire control panel 224 to perform the tasks of the operation.

In one embodiment, a first user can request an action to be performed through mobile device 228 regarding an electronic record generated for the fire control system. Such actions to be performed can require an authentication, such as, for instance, an electronic signature, from at least one other user, as previously described herein. Such actions can include, but are not limited to, transmitting the electronic record to an agency or other third party, storing the electronic record in computing device 230, accessing or modifying the electronic record, printing one or more electronic signatures onto the electronic record, and/or activating an emergency protocol to be initiated within a facility. Mobile device 228 can also be configured to receive an authentication from the first user, as previously described herein. Mobile device 228 can receive the request for the action and transmit the request to computing device 230 via network 226, as illustrated in FIG. 2. Computing device 230 and network 226 can be referred to herein as being part of a "cloud."

Computing device 230 can include a memory, which can store information such as a list of users whose authentication is required for each action to be performed. In some embodiments, an action may require the authentication of multiple users. Furthermore, some actions may require authentication from at least one of a pre-defined group of users. The memory can also store a different certificate for each user of the system. Each certificate can have a one or more corresponding authentications. Types of authentications that can correspond to a certificate for a given user can include, but are not limited to, specific passwords, codes, physical keys or cards, and face identification or other biometric authentications, such as finger prints and hand scans of a specific user. In some embodiments, a user may be able to set which types of authentication they would like to use once their certificate is uploaded.

In some embodiments, the memory of computing device 230 may also include instructions executable by a processor of the cloud to meet industry-specific requirements before performing actions. For example, if a user has requested to transmit certain records (e.g., documents) to an agency and industry-specific regulations require that a document be electronically signed by a certain party before being transmitted to an agency, the memory can include instructions executable by a processor to obtain authentication from that party and copy the required electronic signatures onto a document before transmitting it to the agency.

Computing device 230 can be further configured to determine (e.g., identify) one or more users whose authentication is required for the requested action, as previously described herein. Computing device 230 can also determine which type of authentication is preferred for each required user. Computing device 230 can then notify each required user through a mobile device (e.g., mobile device 232) of the user, such as, for instance, through a mobile application housed on the mobile device. Each required user can then provide an authentication through their mobile device, which can then be transmitted back to computing device 230 via network 226.

Computing device 230 can be configured to verify that each received authentication matches at least one of the possible authentications corresponding to each required user. Upon determining that at least one of the received authentications does not match at least one of the possible authentications corresponding to the user, computing device 230 can be configured to notify the user through the mobile application on the mobile device 228 and/or 232 that the authentication received does not match the authentication of record for that user. This can allow the user to again provide an authentication, which can be transmitted back to the computing device 230 via network 226.

Upon determining that an authentication has been received corresponding to each required user and that each authentication received matches at least one of the possible authentications corresponding to the user the authentication was received from, computing device 230 can cause the requested action to be performed. For example, computing device 230 can perform the requested action, or transmit instructions to an additional device of the system, such as an emergency notification device to perform the requested action.

Figure 3:
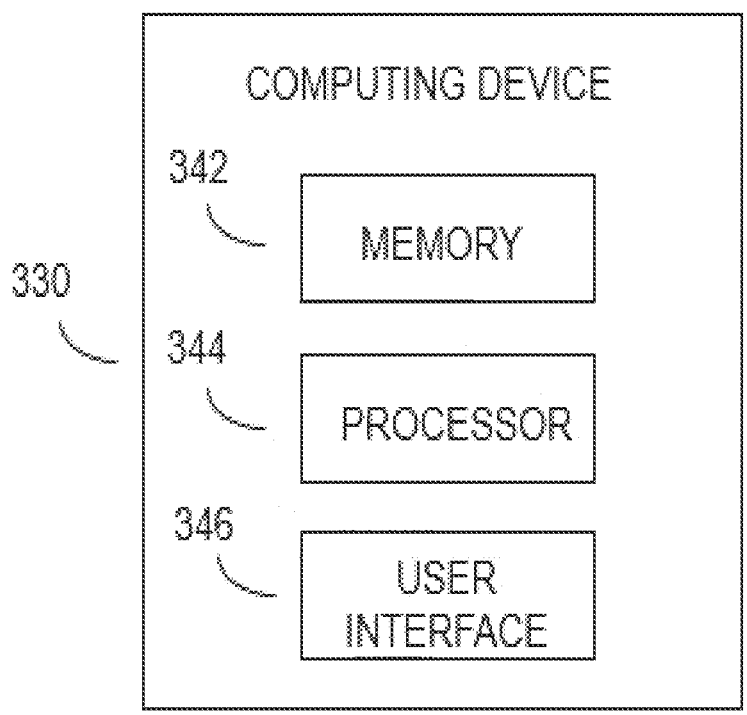
FIG. 3 illustrates an example of a computing device of a multi-level authentication system in accordance with an embodiment of the present disclosure.

FIG. 3 illustrates an example of a computing device 330 of a multi-level authentication system in accordance with an embodiment of the present disclosure. Computing device 330 can be, for instance, computing device 230 previously described herein in connection with FIG. 2.

As shown in FIG. 3, computing device 330 can include a processor 344 and a memory 342. Memory 342 can be any type of storage medium that can be accessed by processor 344 to perform various examples of the present disclosure. For example, memory 342 can be a non-transitory computer readable medium having computer readable instructions (e.g., computer program instructions) stored thereon that are executable by processor 344 to perform various examples of the present disclosure. That is, processor 344 can execute the executable instructions stored in memory 342 to perform various examples in accordance with the present disclosure.

As previously discussed, memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM), resistive random access memory (RRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 342 is illustrated as being located in computing device 330, embodiments of the present disclosure are not so limited. For example, memory 342 can also be located internal to another computing resource (e.g., enabling computer readable instructions to be downloaded over the Internet or another wired or wireless connection).

As shown in FIG. 3, computing device 330 can include a user interface 346. A user (e.g., operator) of computing device 330 can interact with computing device 330 via user interface 346. For example, user interface 346 can provide (e.g., display) information to and/or receive information from (e.g., input by) the user of computing device 330.

In some embodiments, user interface 346 can be a graphical user interface (GUI) that can include a display (e.g., a screen) that can provide information to, and/or receive information from, the user of computing device 330. The display can be, for instance, a touch-screen (e.g., the GUI can include touch-screen capabilities). As an additional example, user interface 346 can include a keyboard and/or mouse that the user can use to input information into computing device 330, and/or a speaker that can play audio to, and/or receive audio (e.g., voice input) from, the user. Embodiments of the present disclosure, however, are not limited to a particular type(s) of user interface.

Figure 4:
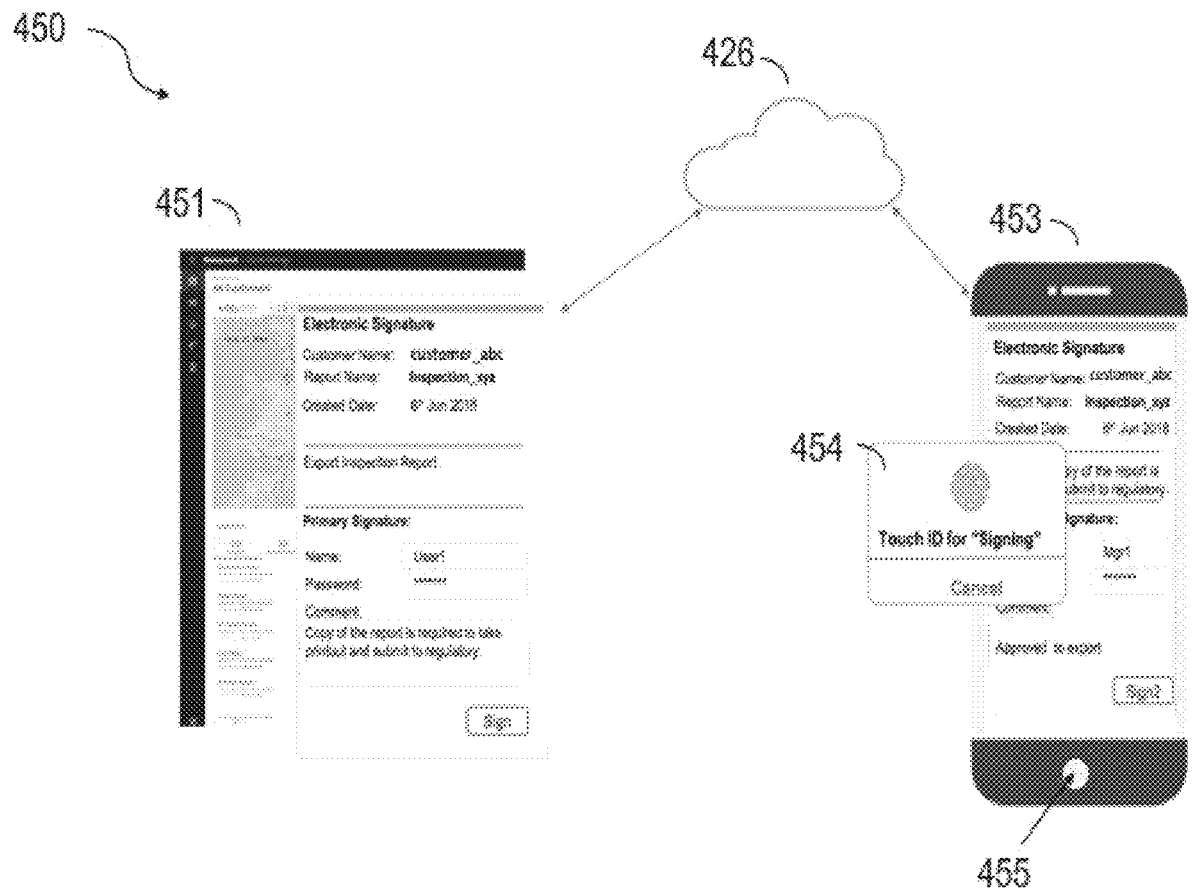
FIG. 4 illustrates an example of a system of multi-level authentication for a fire control system in accordance with an embodiment of the present disclosure.

FIG. 4 illustrates an example of a system 450 of multilevel authentication for a fire control system according to one or more embodiments of the present disclosure. As shown in FIG. 4, system 450 can include a web application 451 and a mobile application 453.

In accordance with some embodiments of the present disclosure, a first user can, through web application 451, request an action to be performed regarding an electronic record generated for the fire control system. For example, a user could request the action of printing electronic signatures onto a report generated by the web application and sending a copy of the report to a local machine.

The web application (e.g., web app) 451 can receive a first authentication from the first user. This authentication can, for example, be in the form of a password. In some embodiments, the first user may also input comments to be relayed to any users whose authentication is also requested. For example, if the first user wishes to copy a report to a local machine, the first user may input a comment conveying that a physical copy of the report is required to be transmitted to an agency.

The first authentication, request for the action to be performed, comments, and documents pertaining to the request can be transmitted to a network 426. Documents pertaining to the request that can be transmitted can include, but are not limited to, generated reports, documents requiring electronic signatures, or documents containing additional information about the request. As discussed in accordance with FIG. 2, the network 426 can be part of a cloud that also includes a computing device. The computing device can be configured to retrieve a certificate corresponding to the first user and verify that the authentication received from the first user matches the authentication corresponding to a certificate corresponding to the first user, as previously described herein.

Upon determining that the authentication received from the first user does not match the authentication corresponding to the certificate corresponding to the first user, the computing device of the cloud can be configured to notify the user through the web app 451 that the authentication did not match the authentication on file corresponding to the user. The web app 451 can then receive another authentication from the first user. In some embodiments, the user may not be required to input the action to be performed, comments, or documents pertaining to the request a second time.

In some embodiments, the web app 451 can be configured to receive from the first user an input identifying one or more users from whom authentication is required to perform the requested action and/or whose electronic signature is required to be printed on a document. In some embodiments, upon determining that the authentication received from the first user matches the authentication corresponding to the certificate corresponding to the first user, the computing device of the cloud can be configured to determine one or more users whose authentication is required to perform the requested action and/or whose electronic signature is required to be printed on document, as previously described herein.

Each of the users whose authentication is required can be notified of the request through a mobile application 453 included on a mobile device of the user. The notification can include identification of relevant information associated with the request, such as an identification of the first user to transmit the request, the action for which approval is sought, a customer whom the request pertains to, documents pertaining to the request, the date of the request, etc. In some embodiments, the mobile application 453 on the mobile device may be configured to receive from the user a selection of a type of authentication that they wish to perform. For example, the user may elect to perform the authentication by allowing the user's mobile device to read their fingerprint. A window 454 may appear on the mobile device (e.g. in the mobile application 453 on the mobile device) prompting the user for a finger scan (e.g., "Touch ID"). The user may respond by placing a portion of their finger over a designated space 455 on the mobile device.

In some embodiments, the mobile application 453 included on the mobile device may be configured to print a signature corresponding to the user from whom authentication is received onto the documents pertaining to the request. As discussed previously, a signature for each user can be stored in the computing device of the cloud as part of an electronic certificate corresponding to each user.

In some embodiments, the mobile application 453 can be configured to receive an input of comments from a user whose authentication is required. For example, if the required user wishes to convey further instructions to the first user, the required user can enter text detailing these instructions using the mobile application 453.

The mobile application 454 can be configured to receive an input from the user indicating that the authentication is complete. For example, the mobile application 454 may include a button reading "Sign" that the user can select to finalize the authentication process. In some embodiments, selecting "Sign" can automatically act as an authorization to copy the user's electronic signature onto a relevant document.

Once the mobile application 454 has received an indication that the authentication is complete, the mobile application 454 can transmit the authentication to the network 426 of the cloud. As discussed in connection with FIG. 2, the computing device of the cloud can then verify that an authentication has been received from each of the required users and that each received authentication matches the certificate corresponding to the user.

The authentication can then be communicated from the computing device to the web application 451, along with instructions to execute the requested action, via network 426. The web application 451 can then be used to execute the requested action. Additionally, comments from required users, information about one or more of the authentications, and documents pertaining to the request can be transmitted to the user through the web application 451. In some embodiments, the documents can be copied onto a local machine through the web application 451.

Figure 5:
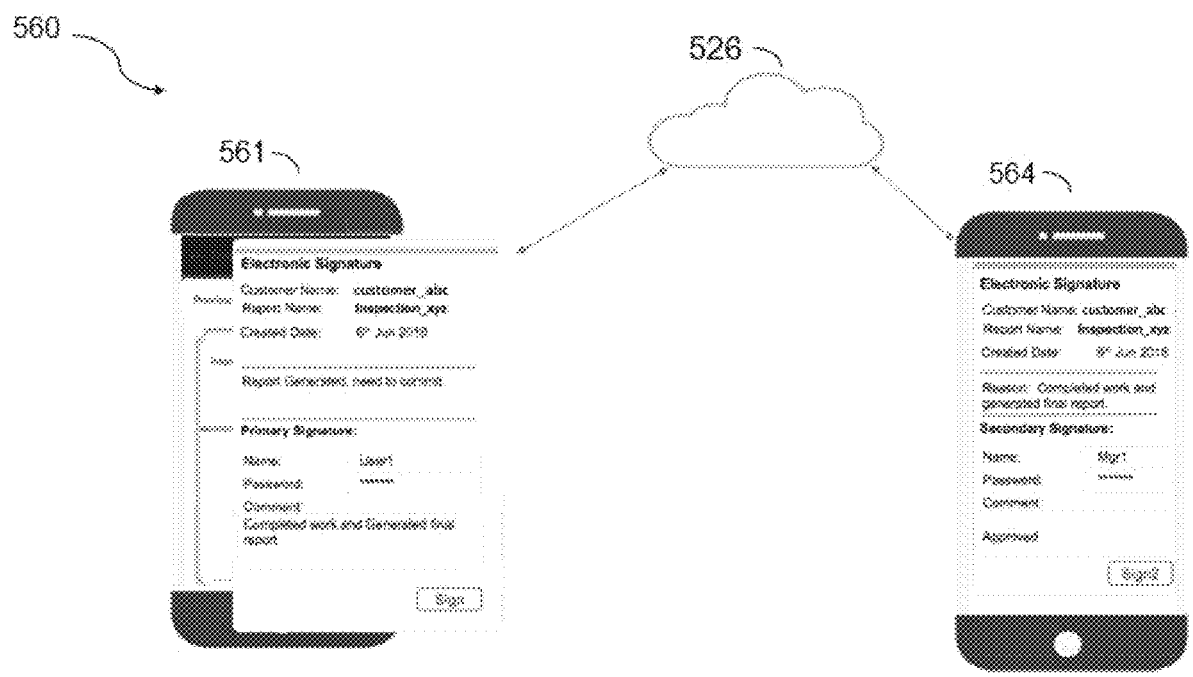
FIG. 5 illustrates an example of a system of multi-level authentication for a fire control system in accordance with an embodiment of the present disclosure.

FIG. 5 illustrates an example of a system 560 of multi-level authentication for a fire control system in accordance with an embodiment of the present disclosure. As shown in FIG. 5, system 560 can include two mobile applications 561 and 564, which can each be included on a different mobile device of a different user. Although only two mobile applications and two devices are illustrated in FIG. 5, it is to be understood that more than two mobile applications and/or more than two mobile devices can be used by more than two users to transmit requests and receiving authentications from users without departing from the scope of the present disclose.

In some embodiments, a first user can submit a request for an action to be performed regarding an electronic document generated for the fire control system using mobile application 561. For example, a requested action could be storing a generated final report to a database in a computing device of a cloud.

As discussed in connection with FIGS. 1 and 2, authentications can be provided through a number of ways. For example, a user may provide an authentication by typing in their credentials (e.g., a username and password). A user may also provide authentication through biometric options, such as finger scans or face recognition.

Through the mobile application 561, the first user can provide a first authentication for the requested action to be performed. In some embodiments, this authentication can include an authorization for the first user's signature to be printed electronically onto a document (e.g., a report) using the mobile application 561. The first authentication, along with comments and documents pertaining to the request, can be transmitted to network 526. As discussed in accordance with FIGS. 1 and 2, the network 526 can be part of a cloud that also includes a computing device in which a certificate corresponding to each user is stored. Each certificate can be associated with a signature to be printed electronically on documents authenticated by a user. The certificate can also correspond to types of authentication accepted from each user and the specific authentication required. For example, if an authentication can be received from a specific user using a passcode, the computing device can store a passcode associated with the certificate of that user.

After the first authentication is transmitted to the computing device, the computing device can determine whether the authentication received from the first user matches the authentication associated with the certificate of that user, as previously described herein. If the authentication does match the authentication stored in association with that user, the computing device can determine one or more users whose authentication is required and then transmit the request, along with the relevant documents and other information, to the mobile application (e.g., mobile application 564) of each required user.

The mobile application 564 can be configured to notify a required user of a request, as previously described herein. The mobile application 564 can also convey to each required user certain details about the request. For example, comments received from a first user can be presented to each required user through the mobile application 564. The mobile application 564 can be configured to receive an authentication from a required user. The mobile application of the mobile device 504 can also be configured to receive additional text entered by the required user to be transmitted to the first user.

The mobile application 564 can receive an indication that the authentication has been finalized from the required user through the mobile device. The authentication, along with documents pertaining to the request and comments entered by the required user, can then be transmitted by the network 526 and computing device of the cloud. The computing device of the cloud can then verify that the authentication received from each required user matches the authentication associated with the certificate corresponding to the required user. Once an authentication from each required user is received and verified, the computing device can transmit a notification to mobile application 561. The mobile application 561 can then notify the first user that the request has been approved (or that authentication has been received). Comments from the required users, along with any other details submitted by a required user, can also be transmitted from the cloud to the mobile application 561.

In some embodiments, the signatures stored in the computing device of the cloud and corresponding to each user who submitted an authentication can each be printed on any documents pertaining to the request.

In some embodiments, once an authorization from each required user has been received and verified by the computing device of the cloud, the computing device can transmit instructions to execute the requested action to a mobile device, such as the mobile device of the first user. The computing device can also transmit instructions to execute the requested action to other components of the system. For example, the computing device can transmit instructions to the fire control system of a facility to initiate an emergency protocol. In some embodiments, the computing device can perform the requested action. For example, if the requested action is transmitting a report to an agency, the report can be transmitted to the agency through the network 526 by the computing device.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure. It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A multi-level authentication system for a fire control system, comprising:
    a first device configured to:
        receive a request corresponding to an action to be performed regarding an electronic record generated for a fire control system; and receive a first authentication from a first user for the action regarding the electronic record to be performed;

wherein the action regarding the electronic record to be performed is performed by a fire control system of a facility where the first user is located when the first authentication and request are received;

one or more secondary devices configured to:
receive a notification of the request;
and receive a secondary authentication from at least one of a number of required users for the action regarding the electronic record to be performed; and a computing device configured to:
receive the first authentication from the first device and each of the secondary authentications from each of the one or more secondary devices; and
perform the action regarding the electronic record based on the first authentication received from the first device and each of the secondary authentications received from each of the one or more secondary devices.

2. The system of claim 1, wherein the computing device includes:
a list of users associated with the fire control system; and
authentication data corresponding to each respective one of the users.

3. The system of claim 1, wherein the action to be performed regarding the electronic record includes:
transmitting the electronic record to a third device;
storing the electronic record in the computing device;
modifying the electronic record; or
retrieving the electronic record.

4. The system of claim 1, wherein the first device includes an application for receiving the request corresponding to the action to be performed and the first authentication.

5. The system of claim 1, wherein the first authentication and one or more of the secondary authentication include at least one of:
a biometric input;
a key; and
a signature.

6. The system of claim 1, wherein the processor is configured to verify that each secondary authentication is an authentication required to perform the action.

7. A method of multi-level authentication for a fire control system, comprising:
receiving, from a first user:
a request corresponding to an action to be performed regarding an electronic record generated for a fire control system; and
a first authentication corresponding to the action to be performed regarding the electronic record;
wherein the action regarding the electronic record to be performed is performed by a fire control system of a facility where the first user is located when the first authentication and request are received;
determining one or more required users, wherein one or more secondary authentications corresponding to each of the required users are required for the action regarding the electronic record to be performed;
notifying each of the required users of the request;
receiving a secondary authentication from each of the required users;
verifying that the first authentication matches authentication data corresponding to the first user and that each secondary authentication of the one or more secondary authentications matches authentication data corresponding to the required user from whom each of the one or more secondary authentications was received; and
performing the action regarding the electronic record upon verifying that the first authentication and the one or more secondary authentications match their corresponding authentication data.

8. The method of claim 7, wherein the method includes notifying the each of the one or more required users of the request and receiving a secondary authentication of the one or more secondary authentications from each required user through an application.

9. The method of claim 7, wherein receiving the first authentication or receiving a secondary authentication of the one or more secondary authentications includes receiving data from a physical key.

10. The method of claim 7, wherein the method includes receiving the first authentication and the request from the first user through an application.

11. The method of claim 7, wherein the first authentication is received from a first device of the first user and each of the one or more secondary authentications is received from a secondary device of each of the required users.

12. The method of claim 7, wherein performing the action regarding the electronic record includes generating a document from the electronic record.

13. The method of claim 12, wherein performing the action regarding the electronic record includes printing a signature corresponding to the first user and a signature corresponding to at least one of the required users onto the document.

14. The method of claim 13, wherein performing the action regarding the electronic record further includes transmitting the document to a third user.

15. The method of claim 12, wherein performing the action includes copying the document onto a device.

16. A non-transitory computer readable medium having computer readable instructions stored thereon that are executable by a processor to:
receive, from a first device of a first user, a first authentication and a request corresponding to an action to be performed regarding an electronic record generated for a fire control system, wherein the action regarding the electronic record to be performed is performed by a fire control system of a facility where the first user is located when the first authentication and request are received;
determine one or more required users, wherein a secondary authentication from each of the one or more required users is required for the action regarding the electronic record to be performed;
send, to each secondary device of a number of secondary devices corresponding to each of the one or more required users, a notification of the request;
receive, from each of the number of secondary devices corresponding to each of the one or more required users, a second authentication;
verify that the first authentication matches authentication data corresponding tothe first user and that each secondary authentication received from each of the number of secondary devices matches authentication data corresponding to the each of the corresponding one or more second users; and
cause the action regarding the electronic record to be performed upon verifying that the first authentication and the second authentication match their corresponding authentication data.

17. The computer readable medium of claim 16, wherein the instructions are executable by a processor to determine each of the required users based on a hierarchy of users.

18. The computer readable medium of claim 16, wherein each notification of the request includes at least one of the following:
   one or more documents pertaining to the request;
   one or more comments received from the first user; or
   an identification of the first user.

19. The computer readable medium of claim 16, wherein the action regarding the electronic record to be performed is performed through an application.

\* \* \* \* \*